Patented Sept. 18, 1928.

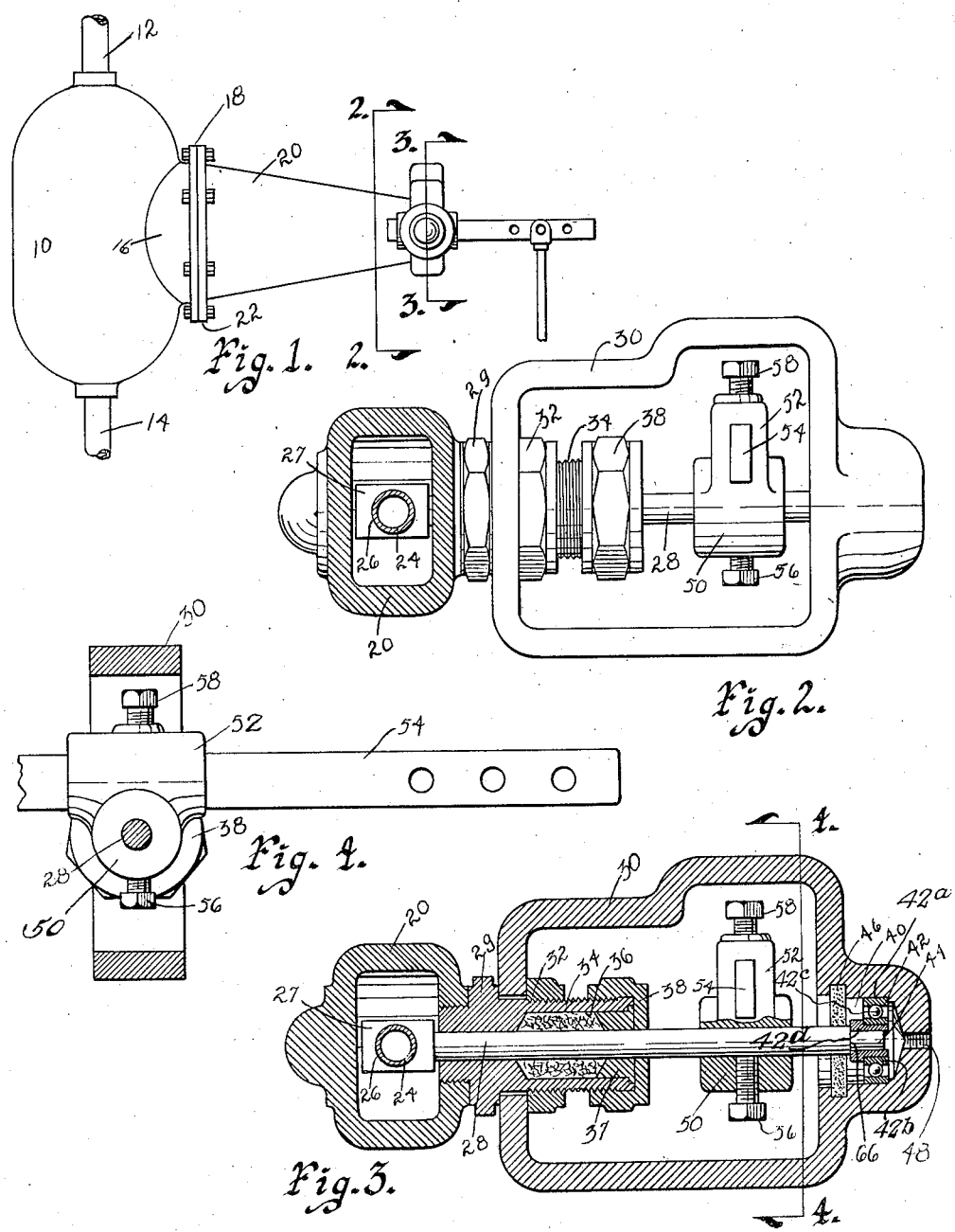

1,685,046

UNITED STATES PATENT OFFICE.

JACOB EIGE, OF MARSHALLTOWN, IOWA, ASSIGNOR TO THE FISHER GOVERNOR COMPANY, INC., OF MARSHALLTOWN, IOWA.

BEARING CONSTRUCTION FOR FLOAT-ARM SHAFTS.

Application filed December 12, 1927. Serial No. 239,450.

The object of my invention is to provide a bearing construction of simple, durable and inexpensive construction for the shaft for a float stem or arm.

In building float control devices for liquids and the like, there is frequently involved the necessity for extending the shaft to which the float arm or stem is connected through the wall of a float cage for an outside connection. The general structure is employed for controlling a valve. The adjustments must frequently be quite delicate, and they must be accurate. The movement of the float must be communicated to the valve with as little retarding friction as possible.

In building a float control in which the shaft operated by the float arm projects through the wall of the casing, difficulties are encountered in suitably journaling the shaft, and the object of my present invention is to provide a mounting for this shaft so constructed and arranged that movement imparted thereto from the float may be transmitted to a controlling lever with a minimum friction.

In this connection, it is my purpose to provide suitable spaced bearings for such shaft and to provide in such a device a ball bearing and means for taking care of end thrust.

With these and other objects in view, my invention consists in the construction, arrangement and combination of the various parts of my construction, whereby the objects contemplated are attained, as hereinafter more fully set forth, pointed out in my claims, and illustrated in the accompanying drawings, in which:

Figure 1 is a side elevation of a bearing construction for a float arm shaft assembled in connection with a float control mechanism.

Figure 2 is a detail, sectional view taken on the line 2—2 of Figure 1.

Figure 3 is a sectional view taken on the line 3—3 of Figure 1; and

Figure 4 is at top or plan view of the bearing construction, a part of the flat cage and the bushing whereby the float arm is mounted on the shaft being shown in horizontal section.

In the accompanying drawings, I have used the reference numeral 10 to indicate generally a float cage, which is adapted to be connected with a tank or the like by means of the pipes 12 and 14.

At one side, the float cage has a passage surrounded by the peripheral flange 18.

A hollow, conical float cage extension member 20 has at its larger end a flange 22 suitably detachably bolted to the flange 18.

The cage 10 is intended to receive a float, not here shown, from which the arm 24 projects into the small end of the float cage extension 20. The arm 24 is screwed into a socket 26 formed on a bushing 27. The bushing 27 is fixed on the inner end of the shaft 28.

A fitting 29 is screwed into the side of the extension 20 and projects laterally therefrom. The shaft 28 is rotatably extended through the fitting 29.

A rigid frame 30 is snugly fitted on the fitting 29 and is held in position by a lock nut 32. In the outer end of the fitting 29 is a suitable recess 34 for a packing 36, which is held in place by a gland 37 and screw cap 38.

In the end of the frame farthest from the fitting 29 is a suitable recess 40 in which is a ball bearing 42, which receives the reduced spindle 44 formed on the outer end of the shaft 28. The ball bearing may comprise two concentric rings $42^a$ and $42^b$, retaining balls $42^c$ therebetween, and an inner sleeve member $42^d$ against which the shoulder 66 of the spindle 44 abuts.

In that portion of the frame 30, which has the recess 40 is an annular groove 46 to receive a felt washer for retaining oil for the ball bearing.

The end of the frame 30 which has the recess 40 is provided with a threaded opening 48 for receiving a tube for conducting lubricant to the bearing.

On the shaft 28 between the two bearings therefor is a collar 50 having the extension 52 through which is adjustably slid the lever arm 54. The collar 50 is adjustably secured in position on the shaft by means of the set screw 56. The lever 54 is adjustably locked in the extension by means of the set screw 58.

It will be noted that when the arm 24 swings up and down, it rotates or rocks the shaft 28. If the shaft 28 has a bearing only at one end, it is liable to bind somewhat.

I have therefore provided the frame 30, which affords means for mounting the ball bearing 42 at a point substantially spaced from the bearing formed by the fitting 29 for thus preventing any binding of the shaft 28 in its bearings.

The float cage of this kind is frequently used under conditions where the interior thereof is subject to considerable pressure.

It will be obvious that the pressure in the extension 20 will exert some force tending to push the shaft 28 longitudinally to the right, as shown in Figure 3, because there is a greater area exposed to pressure in this direction.

This fact also involves a problem in connection with float controls of this general type.

My bearing construction helps to take care of such end thrust.

It will be noted that there is a shoulder 66 adjacent to the spindle end 44 of the shaft 28 which bears against the assembly of the ball bearing 42 and thus takes care of end thrust.

Such a construction is simple, relatively inexpensive, and very efficient for accomplishing its purpose of affording a bearing with a minimum of friction.

Spaced bearings for the shaft 28 tend to prevent any binding and the construction shown takes care of end thrust.

I claim as my invention:

1. In a structure of the class described, a float casing, a journal formed at the side of said casing, a shaft rotatably extended through said journal and adapted to be connected with a float arm at its inner end, a frame mounted on said journal having at its end opposite said journal a ball bearing, said shaft having a reduced spindle journaled in said ball bearing, and a shoulder adjacent to said ball bearing.

2. In a device of the class described, a float arm casing, a shaft journal at the side thereof, a shaft extending from the interior of the casing through said journal and adapted to be connected with a float arm at its inner end, a frame detachably mounted on said journal, having at its outer end a recess, a ball bearing in said recess, said shaft having a reduced end received in said ball bearing, and a shoulder adjacent said ball bearing, and a felt washer in said recess surrounding said shaft for holding lubricant in the recess.

3. In a device of the class described, a float arm casing, a shaft journal at the side thereof, a shaft extending from the interior of the casing through said journal and adapted to be connected with a float arm at its inner end, a frame detachably mounted on said journal having at its outer end a recess, a ball bearing in said recess, said shaft having a reduced end received in said ball bearing, and a shoulder adjacent to said ball bearing, a felt washer in said recess surrounding said shaft for holding lubricant in the recess, and a lubricant supplying passage communicating with said recess.

4. In a device of the class described, a float arm casing, a fitting screwed into the side thereof, a shaft journaled in said fitting and extending from the casing therethrough and adapted to be connected with a float arm at its inner end, a frame mounted on said fitting, a nut on said fitting for holding said frame in place, said frame having in its end opposite the fitting a recess, a ball bearing received in said recess for journaling the outer end of said shaft.

5. In a device of the class described, a float arm casing, a journal at the side thereof, a shaft projecting from said casing through said journal and adapted to be connected with a float arm at its inner end, a frame projecting laterally from said journal, a ball bearing in the outer end of said frame, serving as a journal for the outer end of said shaft.

6. In a structure of the class described, a float arm casing, a journal at the side thereof, a shaft rotatably extended through said journal and adapted to be connected with a float arm at its inner end, and projecting from the casing at its outer end, a frame detachably supported on said casing having in its end opposite said journal a bearing for said shaft.

7. In a structure of the class described, a float arm casing, a journal at the side thereof, a shaft rotatably extended through said journal and adapted to be connected with a float arm at its inner end, a bearing for the outer portion of the shaft, and a frame projecting from the casing and supporting said bearing in alignment with said journal.

8. In a device of the class described, a float arm casing, a shaft journal at the side thereof, a shaft extending from the interior of the casing through said journal and adapted to be connected with a float arm at its inner end and projecting from the casing at its outer end, a frame detachably mounted on said journal having at its outer end a bearing for said shaft and a felt washer in said outer end surrounding said shaft for preventing passage of lubricant along the shaft.

Des Moines, Iowa, August 5, 1927.

JACOB EIGE.